2 Sheets—Sheet 1.

R. E. PETERSON & E. J. FROST.
Bronzing-Machine.

No. 209,624. Patented Nov. 5, 1878.

Witnesses:
James B. Stewart
George C. Stewart

Robert Evans Peterson
Edward J. Frost  Inventors
By Joseph J. Stewart  Atty.

2 Sheets—Sheet 2.

R. E. PETERSON & E. J. FROST.
Bronzing-Machine.

No. 209,624. Patented Nov. 5, 1878.

Witnesses:
James B. Stewart
George C. Stewart

Robert Evans Peterson Inventors
and Edward J. Frost
By Joseph I. Stewart atty.

UNITED STATES PATENT OFFICE.

ROBERT E. PETERSON AND EDWARD J. FROST, OF PHILADELPHIA, PA.

IMPROVEMENT IN BRONZING-MACHINES.

Specification forming part of Letters Patent No. 209,624, dated November 5, 1878; application filed October 10, 1878.

*To all whom it may concern:*

Be it known that we, ROBERT EVANS PETERSON and EDWARD J. FROST, of Philadelphia, in the State of Pennsylvania, have invented a new and useful Improvement in Bronzing-Machines, which improvement is fully set forth in the following specification, reference being had to the accompanying drawings.

The object of our invention is to construct a bronzing-machine that will deposit bronze-powder or other similar substances, by means of a constantly-circulating current of air upon sheets of paper, or other material that has been prepared with a size or other matter, in such manner as to retain any powder or similar substance where such substance may come in contact, and remove or clean away all such powder and substance where such is not intended to be deposited, as will be hereinafter described.

Figure 1:
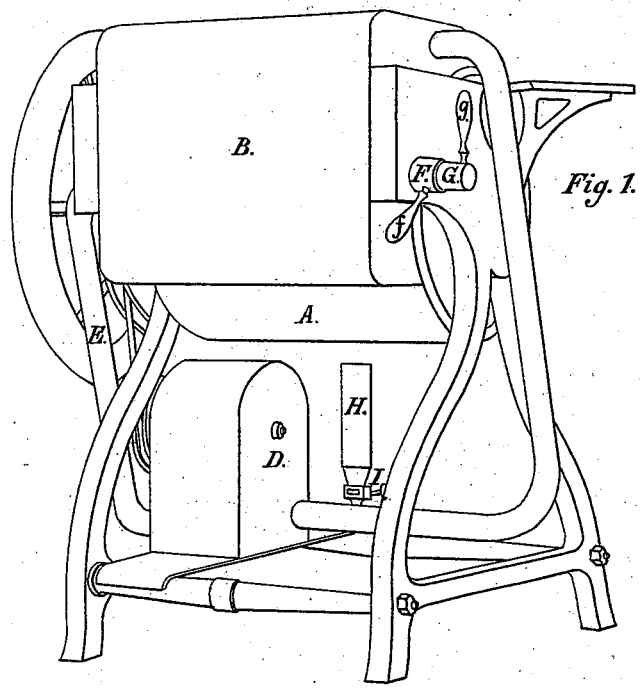
Figure 2:
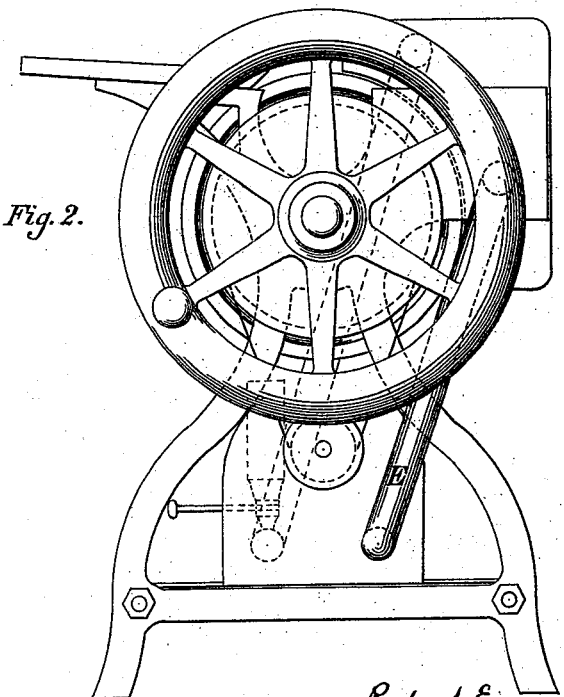
Figure 3:
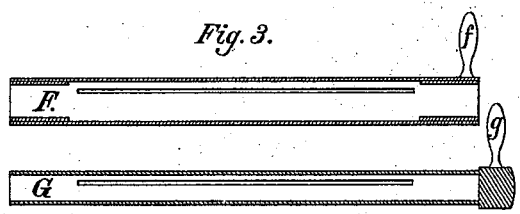
Figure 4:
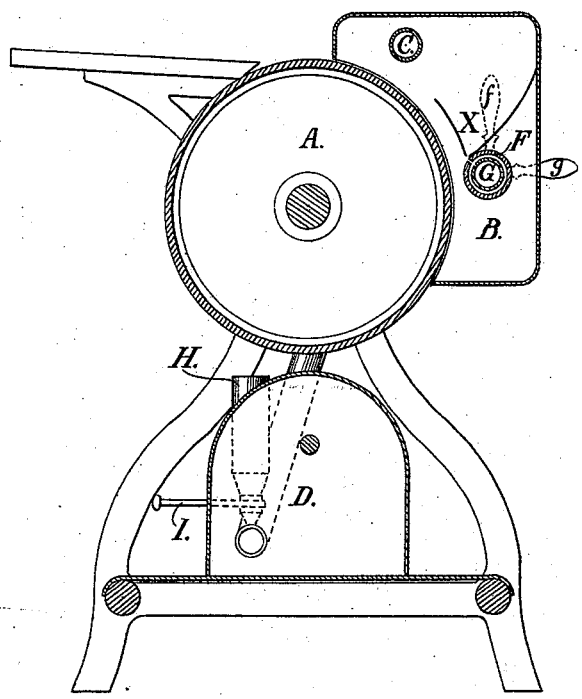

Figure 1 represents a perspective view of a machine embodying our invention. Fig. 2 represents a side elevation, showing the different parts of our invention. Fig. 3 represents the movable and adjustable slotted pipes, marked F and G, each having a handle, withdrawn from the chamber in which they operate. Fig. 4 represents a vertical sectional view of our invention.

The principal features of the machine embodying our invention are:

First, a feeding and discharging cylinder, A, which is not new, but similar to the ordinary cylinder of the rotary printing-press, operated in the same way by means of a shaft and gearing, with power applied in any of the usual methods. This cylinder feeds the sheets into the air-chamber, and discharges them therefrom when finished in the same manner as a like cylinder operates in the well-known rotary printing-press.

Secondly, the air-chamber B, within which the operation of bronzing is performed, and which is kept constantly filled with rapidly-agitated particles of bronze or powder, intended to be deposited upon the sized sheets brought in contact therewith by the revolving cylinder. This air-chamber is fitted with a perforated pipe, C, running across its entire length, near the top, passing outside at one side of said chamber, where it becomes air-tight and is bent downward and carried into the blower D. This pipe we call the "supply-pipe," because it supplies the blower with air, and also with the bronze or other powder to be used. The air-chamber B is also provided with a discharge-pipe, E, which leads from the blower, and the movable and adjustable pipes F and G, with handles *f* and *g* outside, which pass from the opposite side of said chamber through the same and fit into a bush at the mouth of said discharge-pipe, in such a manner as to become a continuation thereof. These movable pipes F and G are provided with slots, through which the bronze is discharged into the air-chamber, where it is kept in a state of constant agitation by means of a current of air forced through the pipe E by the blower D. The pipe G is smaller than the pipe F, and works inside thereof by means of the handle *g*, in such manner as to enable the operator to control the supply of the bronzing material and the force of the air-current admitted into the air-chamber B. The air-chamber B is also supplied with a partition, (shown in the sectional view, Fig. 4, marked X,) the object of which is to catch the heavier particles of bronze or powder, and pass them by gravitation into the air-current, so there may be no clogging.

Thirdly, the blower D and feeding-box or receiver H, which is attached to the supply-pipe C by means of the regulating-valve I. Into this feeding-box or receiver H the bronze-powder, or other material intended to be deposited, is placed, whence it passes through the regulating-valve I into the supply-pipe C, through which it is drawn by suction or atmospheric pressure into the blower D, where it is immediately taken up and forced by the blower through the discharge-pipe E and the movable slotted pipes F and G into the air-chamber B, where by the same means the said powder or bronze is kept in a state of constant and rapid agitation and circulation, the particles thereof attaching themselves to the sheets of paper, or other substance properly sized to catch and retain the same, as they are passed through said chamber by the cylinder A in its revolutions for that purpose. This receiver could be placed on the forcing instead of the suction side of the blower, and its discharged contents be driven forward directly instead of being first drawn in; but we regard the existing arrangement as preferable.

Hitherto the bronzing of printed or sized paper has been done by rubbing processes only, either by hand, brush, pad, or an equivalent thereof, and such bronzing-machines as have been manufactured united these processes.

The object of our invention is to substitute atmospheric air charged with bronze or other powder in place of the hand, pad, or brush process, whether performed manually or by machinery, as possessing many advantages over the same, being simpler, cheaper, more rapid, and more economical, the construction of our machine being such as to prevent waste of material by keeping all that is used in the draft and circulation of a constant current of air, and an avoidance of smudging and broadening lines, to which the other process is subject.

We do not claim the feeding and discharging cylinder or the shaft-gearing or other machinery by which it is made to revolve.

What we claim as our invention, and desire to secure by Letters Patent, is—

1. In a bronzing-machine, an air-chamber provided with pipes for supplying and keeping in constant circulation and agitation a current or currents of air charged with particles of bronze or other powder for deposit on paper or other substance with properly-sized or otherwise prepared retaining-surface, substantially as described.

2. The air-chamber B, with its partition X, the supply-pipe C, passing through said chamber, perforated within and tight without, to the blower D, the discharging-pipe E, the movable and adjustable pipes F and G, with handles $f$ and $g$, and the bronze-receiver H, all substantially as described.

3. The combination of the air-chamber B, the supply-pipe C, the discharge-pipe E, the movable and adjustable slotted pipes F and G, the receiver H, and the blower D with each other and with the revolving cylinder A, all as and for the purpose substantially as described.

ROBERT EVANS PETERSON.
EDWARD J. FROST.

Witnesses:
JOHN BOUVIER PETERSON,
H. N. CARPENTER.